E. A. HARVEY.
Carriage Shaft and Pole Coupling.
No. 74,189.                          Patented Feb. 4, 1868.
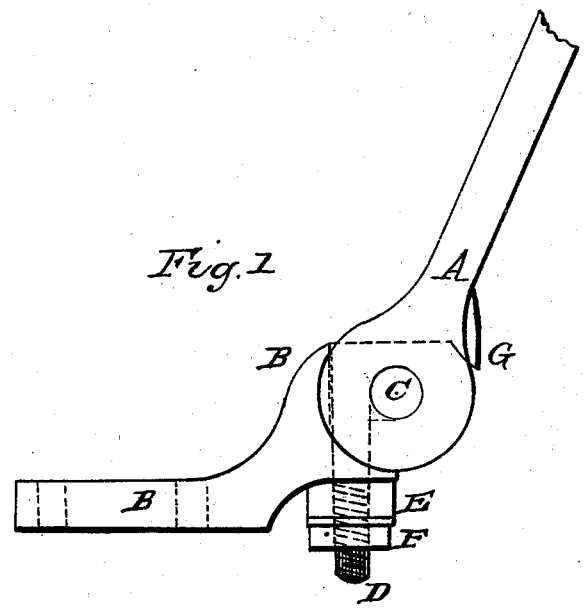
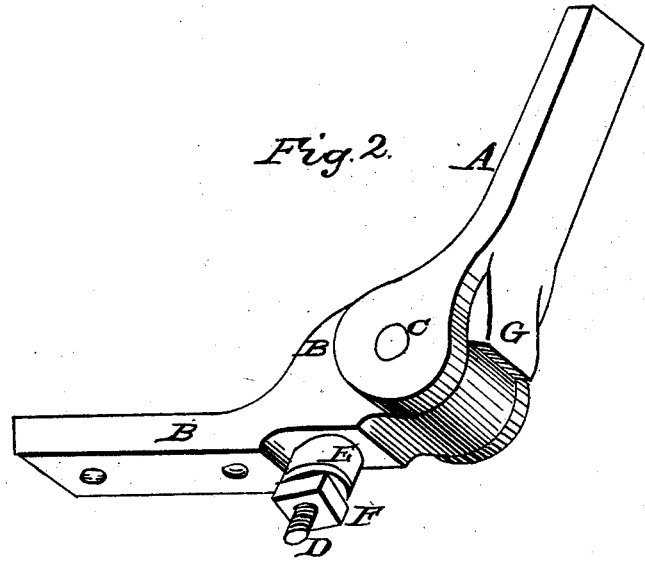

United States Patent Office.

EDMUND A. HARVEY, OF WILMINGTON, DELAWARE.

Letters Patent No. 74,189, dated February 4, 1868.

IMPROVEMENT IN CARRIAGE-SHAFT AND POLE-COUPLING.

The Schedule referred to in these Letters Patent and making part of the same.

TO ALL WHOM IT MAY CONCERN:

Be it known that I, EDMUND A. HARVEY, of the city of Wilmington, State of Delaware, have invented a new and useful Improvement in the Mode of Attaching Carriage-Shafts or Poles to the Axle; and I do hereby declare that the following is a full, clear, and exact description of the same, reference being had to the annexed drawings, making part of this specification, in which—

Figure 1 is a side view of my improvement.

Figure 2, a perspective view of the same.

The nature of my invention consists of an improvement by which carriage-shafts or poles can be attached to axles with ease and dispatch, and is so constructed as to prevent any accident that might occur from the shaft being displaced, and so that the key D can be adjusted to take up any space made by wear on the pin or bolt, or on the hook holding the shaft in place.

To enable others skilled in the art to make and use my invention, I will proceed to describe its construction and mode of operation.

A, fig. 1, is a clevis, to which the shaft or pole is bolted, and is attached by the pin or bolt C to the hook-box B, which is secured to the axle. The key D passes down through the slotted space back of the pin or bolt C, its head clasping and pressing down on said pin or bolt, holding it tight, and preventing rattling. This key D is inserted in such a manner as to be adjusted by the spring-washer E and screw-nut F to take up any wear on the pin or bolt C, or in the hook-box B; or instead of the spring-washer E and screw-nut F, the nut F can be used alone, and by tightening this nut the head of key D is forced down on the pin or bolt C, as shown in fig. 1, thus taking up the wear, as aforesaid. The key-bolt D also prevents the pin or bolt C from unhooking, thus performing a double office. I have also attached or forged on to clevis A a safety-lip, G, whose office is to prevent the unhooking of pin or bolt C, should the key D by any means become displaced. The outer end of the hook-box B being a true circle whose centre is same as pin C, the lip G, by traversing round this outside end, and fitting close to it, prevents the pin C from unhooking in case the key D flies out; and before the pin can become thus unhooked, the clevis-end of the shaft or pole would have to be elevated at or near the perpendicular until the lip G passed the hook, and, thus being disengaged, would free the shaft. The safety-lip can be placed on one or both sides of the clevis A—on one side to keep the pin hooked, and on the other side to keep the key D in its place in case the nut works off.

Having thus described my improvement, what I claim, and desire to secure by Letters Patent, is—

1. I claim the clevis A, with pin or bolt C, with or without either permanent or detachable safety-lips G, in combination with hook-box B, substantially as described.

2. I claim the hook-box B, in combination with key-bolt D, with spring or elastic washer E, for the purposes named.

E. A. HARVEY.

Witnesses:
W. A. A. McKINLEY,
GEO. E. BUCKLEY.